(12) United States Patent
Okumura et al.

(10) Patent No.: US 12,100,871 B2
(45) Date of Patent: Sep. 24, 2024

(54) FUEL CELL SYSTEM

(71) Applicant: TOYOTA JIDOSHA KABUSHIKI KAISHA, Toyota (JP)

(72) Inventors: Makito Okumura, Nagoya (JP); Hisaya Fujioka, Aichi-ken (JP); Atsuo Iio, Nagoya (JP); Toshihiro Egawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 18/046,538

(22) Filed: Oct. 14, 2022

(65) Prior Publication Data

US 2023/0178762 A1    Jun. 8, 2023

(30) Foreign Application Priority Data

Dec. 7, 2021   (JP) .................. 2021-198685

(51) Int. Cl.
*H01M 8/04029* (2016.01)
*H01M 8/0267* (2016.01)
*H01M 8/04007* (2016.01)
*H01M 8/0432* (2016.01)
*H01M 8/04664* (2016.01)

(52) U.S. Cl.
CPC ..... *H01M 8/04029* (2013.01); *H01M 8/0267* (2013.01); *H01M 8/04067* (2013.01); *H01M 8/04358* (2013.01); *H01M 8/04664* (2013.01); *H01M 8/04686* (2013.01)

(58) Field of Classification Search
CPC ......... H01M 8/04029; H01M 8/04067; H01M 8/04358; H01M 8/04679; H01M 8/04664; H01M 8/04671; H01M 8/04686; H01M 8/0267
See application file for complete search history.

(56) References Cited

U.S. PATENT DOCUMENTS

2005/0064257 A1    3/2005  Isoda et al.
2019/0305333 A1*  10/2019  Sato ................. B60L 1/003

FOREIGN PATENT DOCUMENTS

JP    2005093349 A    4/2005
JP    2020136205 A    8/2020

\* cited by examiner

*Primary Examiner* — Jacob M Amick
(74) *Attorney, Agent, or Firm* — Dickinson Wright, PLLC

(57) ABSTRACT

An FC system disclosed herein comprise FC units, a cooler and a controller. Each of the FC units comprises a FC stack, a supply/a return/a circulating passages through which refrigerant flows and first to third temperature sensors. The first to third temperature sensors measure temperatures of the refrigerant in the passages at different positions. The controller is configured to stop a specific FC unit, compare measured values of the first to third temperature sensors of the stopped specific FC unit and, when one of the measured values differs from the other two of the measured values, provide notification about malfunction of the temperature sensor with the different measured value.

2 Claims, 3 Drawing Sheets

FUEL CELL SYSTEM

CROSS-REFERENCE TO RELATED APPLICATION

This application claims priority to Japanese Patent Application No. 2021-198685, filed on Dec. 7, 2021. the entire contents of which are incorporated herein by reference.

TECHNICAL FIELD

The technique disclosed herein relates to a fuel cell system including a plurality of fuel cell stacks.

BACKGROUND

For example, Japanese Patent Application Publication No. 2005-093349 and Japanese Patent Application Publication No. 2020-136205 each describe a fuel cell system including a plurality of fuel cell stacks. Since the fuel cell stacks generate heat while they generate electricity, the fuel cell system includes a cooler which cools the plurality of fuel cell stacks. The fuel cell system of Japanese Patent Application Publication No. 2005-093349 includes one common cooler for the plurality of fuel cell stacks. Refrigerant supplied from the one cooler is distributed to the plurality of fuel cell stacks. The fuel cell system of Japanese Patent Application Publication No. 2020-136205 includes the same number of coolers as the fuel cell stacks, and each of the coolers cools its corresponding fuel cell stack.

For clearer description, "fuel cell" will simply be hereafter referred to as "FC". That is, "fuel cell system" will simply be referred to as "FC system", "fuel cell unit" will be referred to as "FC unit", and "fuel cell stack" will simply be referred to as "FC stack".

SUMMARY

In order to maintain temperatures of FC stacks within a suitable temperature range, a FC system includes temperature sensors each configured to measure a temperature of refrigerant to be supplied to its corresponding FC stack and a temperature of the refrigerant which passed through the FC stack. When the temperature sensors fail, the FC stacks cannot suitably be cooled. The present disclosure relates to an FC system including a plurality of FC units (FC stacks) and provides a technique for checking temperature sensors included in each of the FC units.

An FC system disclosed herein may comprise a plurality of FC units, a cooler and a controller. Each of the FC units may comprise a FC stack, a supply passage/a return passage/a circulating passage through which refrigerant flows and first to third temperature sensors. The supply passage may supply the refrigerant from the cooler to the FC stack. The return passage may return the refrigerant which passed through the FC stack to the cooler. The circulating passage may be connected to the supply passage and the return passage. The first temperature sensor may be configured to measure a temperature of the refrigerant in the supply passage at a position upstream of a merging point of the supply passage and the circulating passage. The second temperature sensor may be configured to measure a temperature of the refrigerant in the supply passage at a position downstream of the merging point. The third temperature sensor may be configured to measure a temperature of the refrigerant in the return passage.

The controller may be configured to stop a specific FC unit among the plurality of the fuel cell units, and check the temperature sensors by the following processes while operating the FC units other than the specific FC unit so that a total output of the FC units other than the specific FC unit matches a target output. In other words, the controller may be configured to compare measured values of the first, second and third temperature sensors of the stopped specific FC unit and, when one of the measured values differs from the other two of the measured values, provide notification about malfunction of the temperature sensor with the different measured value. Here, "provide notification about malfunction" means to send a signal indicating that the temperature sensor of which measured value is different is malfunctioning to a different computer or a display device.

The FC system disclosed herein can check the temperature sensors while realizing the given target output. When one of the first and the second temperature sensors outputs the measured value different from the measured values outputted from the other two temperature sensors, the controller may be configured to restart the specific FC unit which is stopped. In that case, the controller controls the operating FC units, including the restarted FC unit, so that the total output of the FC system matches the target output.

Details of the technique disclosed herein and further developments will be described in "DETAILED DESCRIPTION".

DETAILED DESCRIPTION

Figure 1:
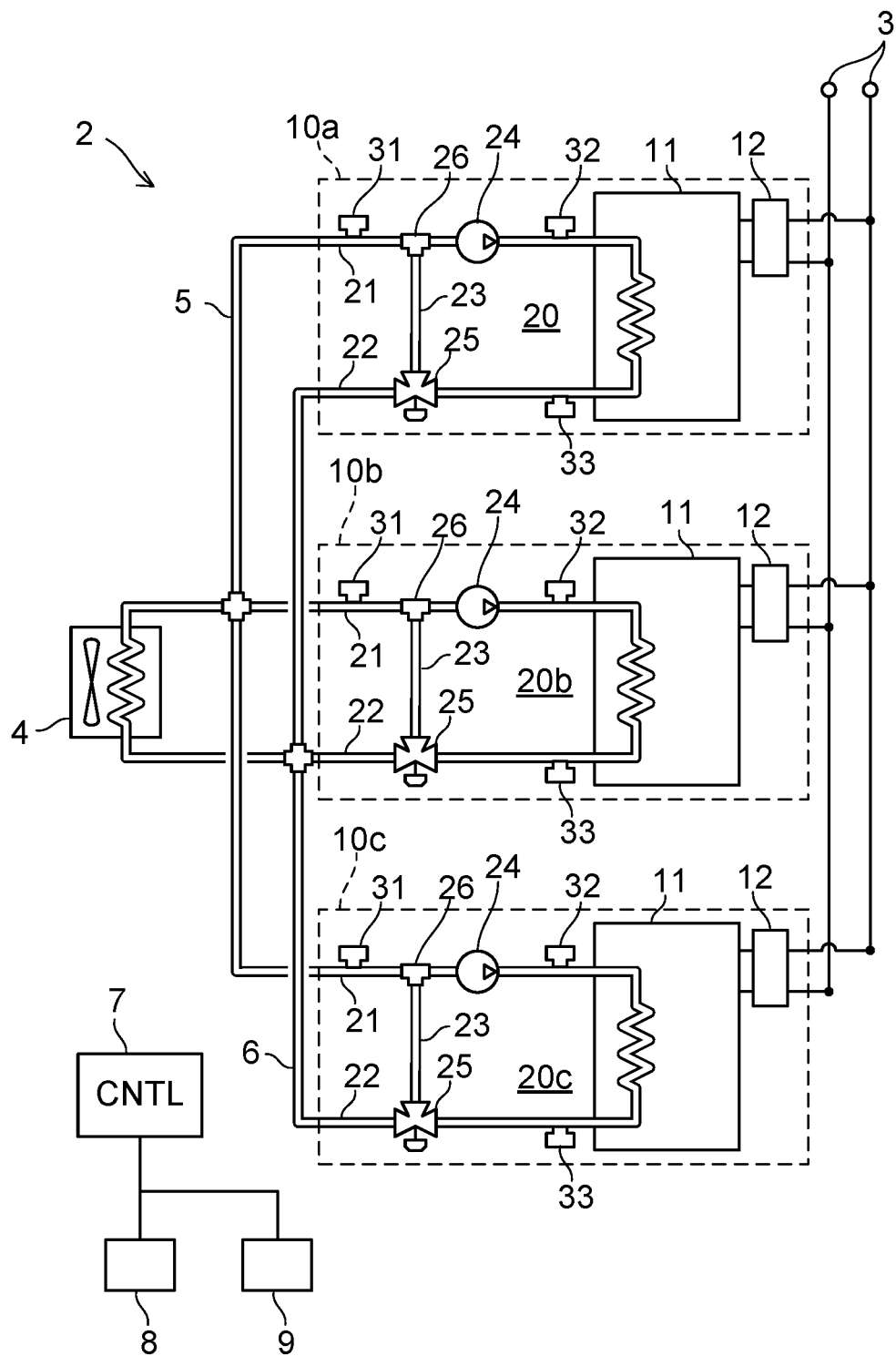
FIG. 1 illustrates a block diagram of a fuel cell system of an embodiment.

With reference to figures, an FC system 2 of an embodiment will be described. As described above. "FC" is a simpler term of a fuel cell. FIG. 1 illustrates a block diagram of the FC system 2. A controller 7 and respective devices (FC stacks 11, step-up converters 12, pumps 24, switch valves 25, temperature sensors 31 to 33) are connected to one another via communication lines, however, illustration of the communication lines is omitted.

The FC system 2 is a power source which generates electricity using the three FC stacks 11, and is configured to supply electric power to a different device from a system output terminal 3.

The FC system 2 includes the three FC units 10a to 10c, a cooler 4, and a controller 7. The three FC units 10a to 10e have the same structures. The three FC units 10a to 10c may be referred to as FC units 10 when they are described without distinction therebetween.

Each of the FC units 10 includes a FC stack 11 and a refrigerant circuit 20. Each of the FC stacks 11 is configured to generate electricity. In each of the FC units 10, the refrigerant circuit 20 receives a cool refrigerant from the cooler 4 and cools the FC stack 11. The refrigerant circuit 20 returns the refrigerant that passed through the FC stack 11 to the cooler 4. The cooler 4 is a radiator configured to release heat of the refrigerant to air.

The step-up converter 12 accompanies each of the FC stacks 11. The step-up converter 12 is connected to a power output terminal of the FC stack 11, and an output terminal of the step-up converter 12 is connected to the system output terminal 3. The step-up converter 12 is configured to step up a direct current generated by the FC stack 11 and supply the same to the system output terminal 3. The electricity generated by the plurality of FC stacks 11 is suppled from the system output terminal 3 to a different device. Even when output voltages of the plurality of FC stacks 11 are different, outputs of the plurality of FC stacks 11 can be summed and outputted from the system output terminal 3 by equalizing output voltages of the step-up converters 12. When electric power is supplied to a device driven by alternating currents, an inverter is connected between the device and the system output terminal 3.

In each of the FC stacks 11, fuel gas (hydrogen gas) and air (oxygen) react, by which electricity is generated. The controller 7 controls amounts of fuel gas and air to be supplied to each of the FC stacks 11, by which desired electricity can be obtained. Illustration of device(s) for supplying fuel gas and air to each of the FC stacks 11 is omitted.

A temperature of each of the FC stacks 11 rises during generation of electricity. The FC system 2 includes the same number of refrigerant circuits 20 as the FC stacks 11, and each of the refrigerant circuits 20 can separately cool its corresponding FC stack 11.

Although the FC system 2 includes the plurality of refrigerant circuits 20 (plurality of FC units 10a to 10c), the plurality of refrigerant circuits 20 shares one cooler 4. A common supply passage 5 and a common return passage 6 are connected to the cooler 4. The common supply passage 5 supplies the refrigerant to the plurality of refrigerant circuits 20 and the common return passage 6 returns the refrigerant flown out of the plurality of refrigerant circuits 20 (refrigerant which passed through the FC stacks 11) to the cooler 4.

The plurality of FC units 10 has the refrigerant circuits 20 having the same structure as one another. Each of the refrigerant circuits 20 includes a supply passage 21, a return passage 22, a circulating passage 23, a pump 24, a switch valve 25, a fluid joint 26, and temperature sensors 31 to 33. The supply passage 21 supplies the refrigerant to its corresponding FC stack 11 from the cooler 4. The return passage 22 returns the refrigerant that passed through the FC stack 11 to the cooler 4. The supply passage 21 communicates with the cooler 4 via the common supply passage 5, and the return passage 22 communicates with the cooler 4 via the common return passage 6. As described above, heat of the refrigerant that passed through the FC stack 11 is released at the cooler 4 to the air, and then the refrigerant is supplied to the FC stack 11 again.

The circulating passage 23 is connected to the supply passage 21 and the return passage 22. The circulating passage 23 returns the refrigerant in the return passage 22 (refrigerant that passed through the FC stack 11) to the supply passage 21. The switch valve 25 is disposed at a connecting point of the circulating passage 23 and the return passage 22. The switch valve 25 is configured to set a destination of the refrigerant flowing in the return passage 22 to one of the cooler 4 and the circulating passage 23. The switch valve 25 is controlled by the controller 7. The circulating passage 23 and the supply passage 21 are coupled by the fluid joint 26.

The pump 24 is disposed on the supply passage 21. The pump 24 is configured to pump the refrigerant to the FC stack 11. The controller 7 controls the pump 24. By adjustment of an output of the pump 24, a flow rate of the refrigerant supplied to the FC stack 11 (i.e., cooling performance) can be adjusted.

Two temperature sensors (a first temperature 31 and a second temperature sensor 32) are disposed on the supply passage 21. The first temperature sensor 31 is disposed at a position upstream of a merging point (fluid joint 26) of the circulating passage 23 and the supply passage 21, and the second temperature sensor 32 is disposed at a position downstream of the merging point (fluid joint 26). In other words, the first temperature sensor 31 is disposed on the supply passage 21 between the merging point (fluid joint 26) and the cooler 4, and the second temperature sensor 32 is disposed on the supply passage 21 between the merging point (fluid joint 26) and the FC stack 11. The first temperature sensor 31 is configured to measure a temperature of the refrigerant supplied from the cooler 4. The second temperature sensor 32 is configured to measure a temperature of the refrigerant flowing into the FC stack 11. The merging point (fluid joint 26) is positioned between the first temperature sensor 31 and the second temperature sensor 32. When the refrigerant that passed through the FC stack 11 flows through the circulating passage 23 into the supply passage 21, measured values of the first temperature sensor 31 and the second temperature sensor 32 may be different.

The third temperature sensor 33 is disposed on the return passage 22. The third temperature sensor 33 is configured to measure a temperature of the refrigerant flowing in the return passage 22 (i.e., temperature of the refrigerant that passed through the FC stack 11). A measured value of the third temperature sensor 33 is dealt as an approximation value of the temperature of the FC stack 11.

The controller 7 adjusts an output of the pump 24 so that the measured value of the third temperature sensor 33 (approximation temperature of the FC stack 11) is within a predetermined allowable temperature range. When the measured value of the second temperature sensor 32 (temperature of the refrigerant flowing into the FC stack 11) is low, the controller 7 controls the switch valve 25 and sets the destination of the refrigerant in the return passage 22 to the circulating passage 23 so that the refrigerant that passed through the FC stack 11 returns to the FC stack 11. By returning the refrigerant that passed through the FC stack 11 again to the FC stack 11, drastic decrease in the temperature of the FC stack 11 can be prevented.

As described above, the three FC units 10a to 10c have the same structure, thus explanations for the other FC units 10b, 10c are omitted.

The controller 7 of the FC system 2 periodically checks if the temperature sensors 31 to 33 of each of the FC units 10 are operating normally. A display 8 and a host controller 9 are connected to the controller 7. When any of the temperature sensors malfunction, the controller 7 sends a signal providing notification about malfunction of the temperature sensor to the display 8 and the host controller 9.

Figure 2:
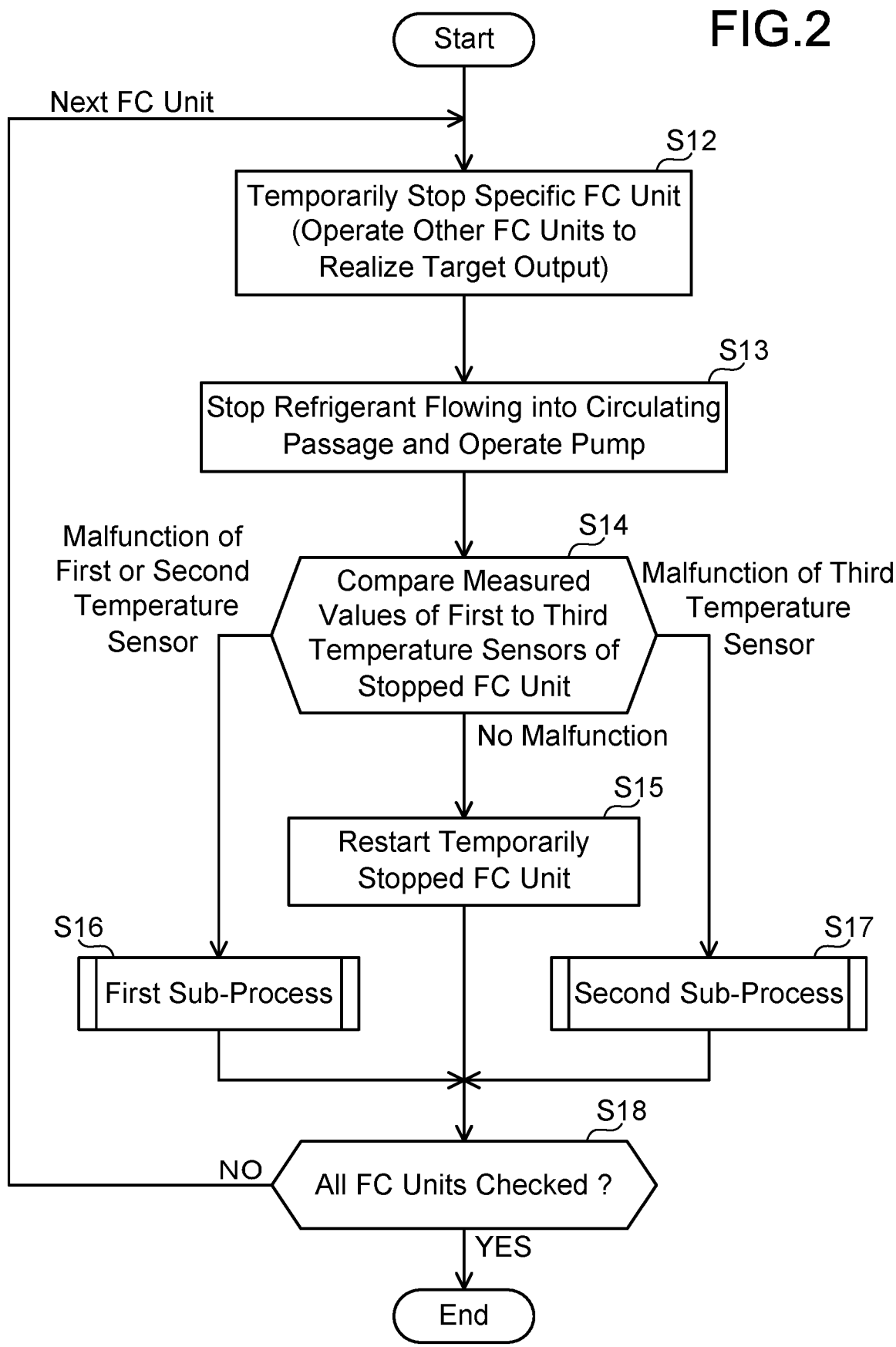
FIG. 2 illustrates a flowchart of a temperature sensor check process.
Figure 3:
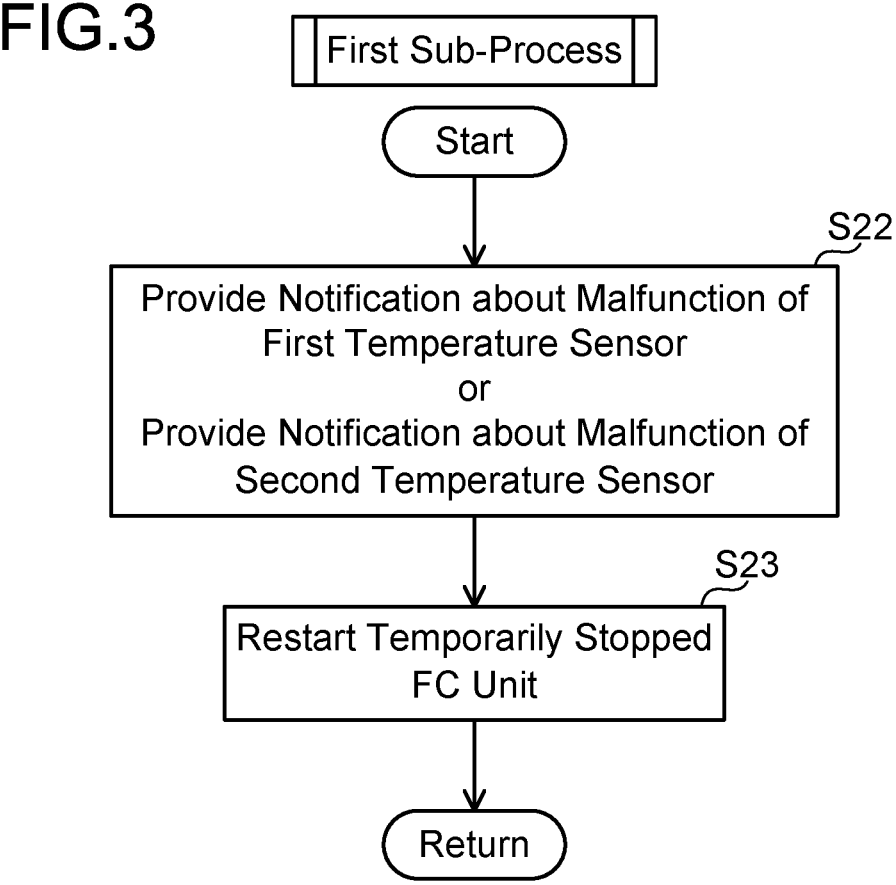
FIG. 3 illustrates a flowchart of a first sub-process of FIG. 2.

With reference to FIG. 2 and FIG. 3, a temperature sensor check process performed by the controller 7 will be explained. The controller 7 periodically performs the process of FIGS. 2 and 3 while at least one of the FC stacks 11 generates electricity. Even while the temperature sensor check process is performed, the controller 7 adjusts the output of the pump 24 of each of the operating FC unit(s) 10 so that a temperature of each of the FC stack(s) 11 (measured value of the corresponding third temperature sensor 33) is within the predetermined allowable temperature range. A target output of the FC system 2 is externally given to the controller 7. The controller 7 operates the plurality of FC units 10 to meet the target output.

Firstly, the controller 7 temporarily stops a specific FC unit 10 (step S12). At this time, the controller 7 operates the (available) FC units 10 other than the specific FC unit to meet a target output given to the FC system 2. "Temporarily stops the FC unit" refers to a state in which supply of fuel gas and air is stopped but the FC unit can restart at any moment. For example, the controller 7 closes a valve (fuel valve) on a pipe for supplying fuel gas to the FC stack 11 and a valve (air valve) on a pipe for supplying air to the FC stack 11, hut leave the other auxiliary devices activated. The "auxiliary devices" herein refer to devices related to operation of the FC stack 11.

Next, the controller 7 controls the switch valve 25 so that the refrigerant does not flow to the circulating passage 23 (step S13). The controller 7 controls the switch valve 25 so that the refrigerant in the return passage 22 (the refrigerant that passed though the FC stack 11) flows into the cooler 4. The controller 7 simultaneously drives the pump 24 which pumps the refrigerant to the FC stack 11 (step S13). The FC stack 11 that is temporarily stopped is not generating electricity, but the FC stack 11 is rapidly cooled by supplying the refrigerant to the FC stack 11.

Since the FC stack 11 is rapidly cooled, a temperature of the refrigerant flowing into the FC stack 11 and a temperature of the refrigerant flowing out of the FC stack 11 become equal. Since the refrigerant does not flow into the circulating passage 23, a temperature of the refrigerant is also equal at positions downstream and upstream of the fluid joint 26.

The controller 7 compares measured values of the first to third temperature sensors 31 to 33 (step S14). When the measured values of all the temperature sensors match, it can be determined that the all the temperature sensors operate normally. "Measured values match" means that a difference among the measured values is within a predetermined difference.

When the measured values of the second temperature sensor 32 and the third temperature sensor 33 match but the measured value of the first temperature sensor 31 does not match the measured value of the second temperature sensor 32 (or the third temperature sensor 33), the controller 7 determines that the first temperature sensor 31 is malfunctioning. "Measured values do not match" means that the difference between the measured values exceeds the predetermined difference.

When the measured values of the first temperature sensor 31 and the third temperature sensor 33 match but the measured value of the second temperature sensor 32 does not match the measured value of the first temperature sensor 31 (or the third temperature sensor 33), the controller 7 determines that the second temperature sensor 32 is malfunctioning. When the measured values of the first temperature sensor 31 and the second temperature sensor 32 match but the measured value of the third temperature sensor 33 does not match the measured value of the first temperature sensor 31 (or the second temperature sensor 32), the controller 7 determines that the third temperature sensor 33 is malfunctioning.

When all the temperature sensors operate normally (the temperature sensors are not malfunctioning), the controller 7 restarts the FC unit that is temperately stopped (step S15). When the first temperature sensor 31 or the second temperature sensor 32 malfunctions, the controller 7 performs a first sub-process (step S16). When the third temperature sensor 33 malfunctions, the controller 7 performs a second sub-process (step S17).

FIG. 3 illustrates the first sub-process. When the first temperature sensor 31 malfunctions, the controller 7 provides notification about malfunction of the first temperature sensor 31 (step S22). Here, "provide notification about malfunction" means to send a signal indicating that the temperature sensor is malfunctioning to the upper controller 9 or the display 8. When the second temperature sensor 32 malfunctions as well, the controller 7 provides notification about malfunction of the second temperature sensor 32 (step S22).

When the first temperature sensor 31 or the second temperature sensor 32 malfunctions, the controller 7 restarts the FC unit 10 that is temporarily stopped (step S23). At this point, the third temperature sensor 33 operates normally. As described above, the measured value of the third temperature sensor 33 shows an approximation value of the temperature of the FC stack 11. As long as the third temperature sensor 33 operates normally, the temperature of the FC stack 11 can be maintained within a tolerable temperature range even when the first temperature sensor 31 or the second temperature sensor 32 malfunctions.

However, when the first temperature sensor 31 or the second temperature sensor 32 malfunctions, this may cause a problem in the following situation. In other words, the controller 7 cannot recognize the temperature of the refrigerant supplied from the cooler 4 (when the first temperature sensor 31 malfunctions). Alternatively, when the refrigerant that passed through the FC stack 11 is flown into the circulating passage 23, the controller 7 cannot recognize the temperature of the refrigerant flowing into the FC stack 11 (when the second temperature sensor 32 malfunctions). In these cases, the controller 7 cannot promptly or accurately control the temperature of the FC stack 11. In this case, the controller 7 limits a maximum output of the FC stack 11 to avoid abrupt change in the temperature of the FC stack 11. With such a process, even when the first temperature sensor 31 or the second temperature sensor 32 malfunctions, the controller 7 can maintain the temperature of the FC stack 11 within the tolerable temperature range based on the measured value of the third temperature sensor 33. After step S23 is performed, the process of the controller 7 shifts to step S18 of FIG. 2.

Figure 4:
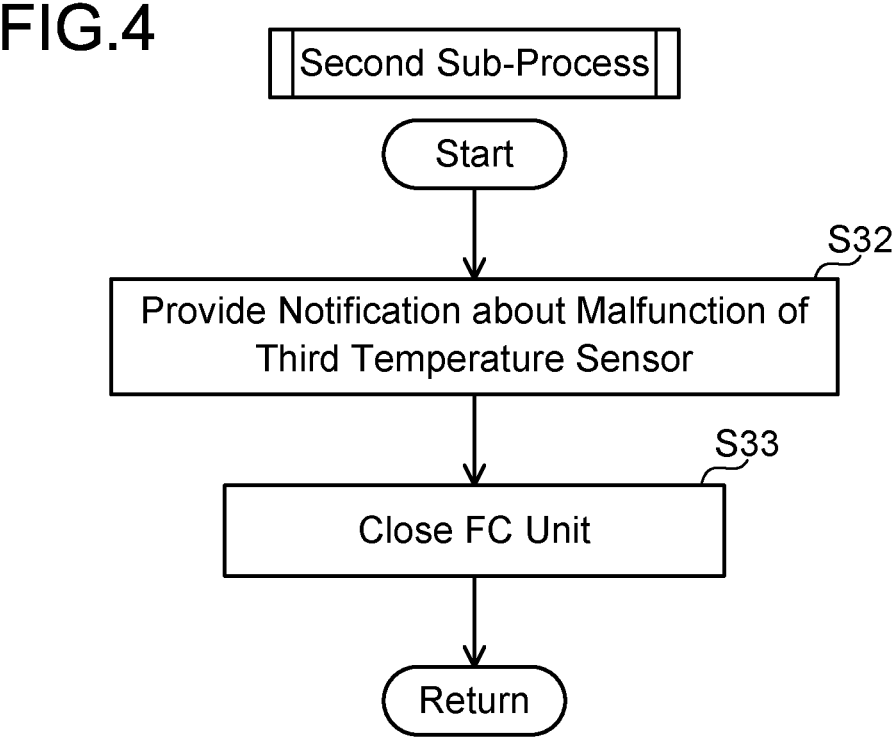
FIG. 4 illustrates a flowchart of a second sub-process of FIG. 2.

FIG. 4 illustrates a flowchart of a second sub-process. When the third temperature sensor 33 malfunctions, the controller 7 provides notification about malfunction of the third temperature sensor 33 (step S32). The meaning of "provide notification about malfunction" in step S32 is the same as the meaning of "provide notification about malfunction" in step S22.

Next, the controller 7 closes the FC unit 10 which is temporarily stopped (step S33). Here, "closes the FC unit 10" means to stop all the auxiliary devices related to operation of the FC unit 10, including the pump 24. The valve on the pipe for supplying fuel gas and valve on the pipe for supplying air to the FC unit 10 remain closed. When the third temperature sensor 33 malfunctions, the controller 7 cannot recognize the temperature of the FC unit 10, thus the FC unit 10 of which third temperature sensor 33 has failed is not used until the third temperature sensor 33 is fixed. After step S33 is performed, the process by the controller 7 shifts to step S18 of FIG. 2.

The controller 7 performs the temperature sensor check process for all the FC units 10 (step S18: NO). When the temperature sensor check process is performed for all the FC units 10, the temperature sensor check process terminates (step S18: YES). When the temperature sensor check process terminates. the controller 7 controls the available FC units 10 so that the target output given to the FC system 2 is met.

As described above, the FC system 2 can check the temperature sensors while meeting the target output.

Characteristics of the FC system 2 of the embodiment will be listed below. The FC system 2 comprises: the plurality of FC units 10a to 10c; the cooler 4 (radiator); the first to third temperature sensors 31 to 33, and the controller 7. Each of the FC units 10 comprises: the FC stack 11; the supply passage 21, the return passage 22, the circulating passage 23, the switch valve 25, and the pump 24. The supply passage 21 supplies the refrigerant from the cooler 4 to the FC stack 11. The return passage 22 returns the refrigerant which passed through the FC stack 11 to the cooler 4. The circulating passage 23 is connected to the supply passage 21 and the return passage 23. The refrigerant in the return passage 22 is returned to the supply passage 21 through the circulating passage 23. The switch valve 25 is configured to set the destination of the refrigerant flowing in the return passage 22 to one of the cooler 4 and the supply passage 21. The first temperature sensor 31 is configured to measure a temperature of the refrigerant in the supply passage 21 at a position upstream of the merging point (fluid joint 26) of the supply passage 21 and the circulating passage 23. The second temperature sensor 32 is configured to measure a temperature of the refrigerant in the supply passage 21 at a position downstream of the merging point. The third temperature sensor 33 is configured to measure a temperature of the refrigerant in the return passage 22. The controller 7 is configured to: stop the specific FC unit 10 and operate the (available) FC units 10 other than the specific FC unit 10 so that a total output of the FC system 2 matches the target output. The controller 7 compares the measured values of the first temperature sensor 31, the second temperature sensor 32 and the third temperature sensor 33 of the specific FC unit 10. When one of the three measured values is different from the other two measured values, the controller 7 provides notification about malfunction of the temperature sensor of which measured value if different.

Notes regarding the technique described in the embodiment will be described. The FC system disclosed herein may include four or more FC units of which power output terminals are connected in parallel. Alternatively, the FC system disclosed herein may be of type including two FC units of which power output terminals are connected in parallel.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. Further, the purpose of the examples illustrated by the present description or drawings is to satisfy multiple objectives simultaneously, and satisfying any one of those objectives gives technical utility to the present disclosure.

What is claimed is:

1. A fuel cell system comprising:
   a plurality of fuel cell units;
   a cooler; and
   a controller,
   wherein
   each of the plurality of the fuel cell units comprises:
   a fuel cell stack;
   a supply passage for supplying refrigerant from the cooler to the fuel cell stack;
   a return passage for returning the refrigerant which passed through the fuel cell stack to the cooler;
   a circulating passage connected to the supply passage and the return passage;
   a first temperature sensor configured to measure a temperature of the refrigerant in the supply passage at a position upstream of a merging point of the supply passage and the circulating passage;
   a second temperature sensor configured to measure a temperature of the refrigerant in the supply passage at a position downstream of the merging point; and
   a third temperature sensor configured to measure a temperature of the refrigerant in the return passage,
   the controller is configured to:
   stop a specific fuel cell unit among the plurality of the fuel cell units;
   operate the fuel cell units other than the specific fuel cell unit so that a total output of the fuel cell system matches a target output; and
   compare measured values of the first, second and third temperature sensors; and
   when one of the measured values differ from the other two of the measured values, provide notification about malfunction of the temperature sensor with the different measured value.

2. The fuel cell system of claim 1, wherein when one of the first and the second temperature sensors outputs the measured value different from the measured values outputted from the other two temperature sensors, the controller is configured to restart the specific fuel cell unit.